United States Patent
Border et al.

(10) Patent No.: US 9,906,725 B2
(45) Date of Patent: Feb. 27, 2018

(54) PORTABLE VIDEO COMMUNICATION SYSTEM

(71) Applicant: Monument Peak Ventures, LLC, Plano, TX (US)

(72) Inventors: John N. Border, Eaton Center, NH (US); Ronald S. Cok, Rochester, NY (US); Amy D. Enge, Spencerport, NY (US); Andrew F. Kurtz, Macedon, NY (US); Joseph A. Manico, Rochester, NY (US); Lynn Schilling-Benz, Fairport, NY (US); Peter O. Stubler, Rochester, NY (US); Frances C. Williams, Rochester, NY (US)

(73) Assignee: MOUNUMENT PEAK VENTURES, LLC, Plano, TX (US)

(*) Notice: Subject to any disclaimer, the term of this patent is extended or adjusted under 35 U.S.C. 154(b) by 0 days.

(21) Appl. No.: 15/271,839

(22) Filed: Sep. 21, 2016

(65) Prior Publication Data

US 2017/0013197 A1    Jan. 12, 2017

Related U.S. Application Data

(60) Continuation of application No. 14/486,254, filed on Sep. 15, 2014, now Pat. No. 9,462,222, which is a
(Continued)

(51) Int. Cl.
*H04N 7/14* (2006.01)
*H04N 5/232* (2006.01)
(Continued)

(52) U.S. Cl.
CPC ..... *H04N 5/23254* (2013.01); *G06K 9/00228* (2013.01); *H04N 5/23248* (2013.01);
(Continued)

(58) Field of Classification Search
CPC ............... H04N 7/14; H04N 5/232248; H04N 5/23254; H04N 5/2258; H04N 5/23267; H04N 2007/046
(Continued)

(56) References Cited

U.S. PATENT DOCUMENTS

| | | | |
|---|---|---|---|
| 6,100,517 | A | 8/2000 | Yahav et al. |
| 6,111,517 | A | 8/2000 | Atick et al. |

(Continued)

FOREIGN PATENT DOCUMENTS

| | | |
|---|---|---|
| EP | 1 416 700 | 5/2004 |
| EP | 1 768 387 | 3/2007 |

(Continued)

OTHER PUBLICATIONS

Final Office Action on U.S. Appl. No. 13/315,737, dated Jun. 24, 2013.

(Continued)

*Primary Examiner* — Melur Ramakrishnaiah
(74) *Attorney, Agent, or Firm* — Ascenda Law Group, PC

(57) ABSTRACT

A method and device for adapting a display image on a hand-held portable wireless display and digital capture device. The device includes a camera for capturing a digital video and/or still image of a user, means for adjusting the captured digital image in response to poor image capture angle of said image capture device so as to create a modified captured digital image; and means for transmitting said modified captured digital image over a wireless communication network to a second hand-held portable wireless display and digital capture device.

17 Claims, 17 Drawing Sheets

Related U.S. Application Data continuation of application No. 13/315,737, filed on Dec. 9, 2011, now Pat. No. 8,842,155, which is a division of application No. 11/755,192, filed on May 30, 2007, now Pat. No. 8,174,555.

(51) Int. Cl.

| | | |
|---|---|---|
| *G06K 9/00* | (2006.01) | |
| *H04N 5/262* | (2006.01) | |
| *H04N 5/272* | (2006.01) | |
| *H04N 21/414* | (2011.01) | |
| *H04N 21/4223* | (2011.01) | |

(52) U.S. Cl.
CPC ........... *H04N 5/2621* (2013.01); *H04N 5/272* (2013.01); *H04N 7/141* (2013.01); *H04N 7/147* (2013.01); *H04N 21/41407* (2013.01); *H04N 21/4223* (2013.01)

(58) Field of Classification Search
USPC .......................... 348/14.01–14.16; 455/556.1
See application file for complete search history.

(56) References Cited

U.S. PATENT DOCUMENTS

| | | | |
|---|---|---|---|
| 6,724,919 B1 | 4/2004 | Akiyama et al. | |
| 6,853,739 B2 | 2/2005 | Kyle | |
| 7,058,433 B2 | 6/2006 | Carpenter | |
| 7,227,567 B1 | 6/2007 | Beck et al. | |
| 7,427,983 B1 | 9/2008 | Hildebrandt et al. | |
| 7,554,570 B2 | 6/2009 | Benco et al. | |
| 7,697,024 B2 * | 4/2010 | Currivan | H04N 7/141 348/14.01 |
| 7,948,513 B2 | 5/2011 | Rockefeller et al. | |
| 8,208,010 B2 | 6/2012 | Nelson et al. | |
| 2001/0051509 A1 | 12/2001 | Mukai et al. | |
| 2002/0113884 A1 | 8/2002 | Tanii et al. | |
| 2003/0139984 A1 | 7/2003 | Seigel | |
| 2004/0070666 A1 | 4/2004 | Bober et al. | |
| 2004/0257431 A1 | 12/2004 | Girish et al. | |
| 2005/0146620 A1 | 7/2005 | Monroe et al. | |
| 2005/0212656 A1 | 9/2005 | Denison et al. | |
| 2006/0008172 A1 * | 1/2006 | Choi | H04N 1/3878 382/254 |
| 2006/0017752 A1 | 1/2006 | Kurzweil et al. | |
| 2006/0017814 A1 | 1/2006 | Pinto et al. | |
| 2006/0097844 A1 | 5/2006 | Nakashima et al. | |
| 2006/0123465 A1 | 6/2006 | Ziegler | |
| 2006/0148517 A1 | 7/2006 | Yu | |
| 2007/0057866 A1 | 3/2007 | Lee et al. | |
| 2007/0076982 A1 * | 4/2007 | Petrescu | H04N 5/144 382/294 |
| 2007/0173266 A1 | 7/2007 | Barnes, Jr. | |
| 2007/0199047 A1 | 8/2007 | Gibart et al. | |
| 2007/0249396 A1 | 10/2007 | Nitta et al. | |
| 2007/0252674 A1 | 11/2007 | Nelson et al. | |
| 2008/0004073 A1 * | 1/2008 | John | H04N 5/23248 455/556.1 |
| 2008/0030621 A1 | 2/2008 | Ciudad et al. | |
| 2008/0063389 A1 | 3/2008 | Fang et al. | |
| 2008/0259154 A1 | 10/2008 | Garrison et al. | |
| 2008/0266326 A1 | 10/2008 | Porwal | |

FOREIGN PATENT DOCUMENTS

| | | |
|---|---|---|
| JP | 2002-288670 | 10/2002 |
| JP | 2004-112820 | 4/2004 |
| JP | 2005-092657 | 4/2005 |
| WO | WO-2006/003066 | 1/2006 |

OTHER PUBLICATIONS

Final Office Action on U.S. Appl. No. 14/486,254 dated Apr. 13, 2016.
G. Aggarwal, A. Chowdhury, R. Chellappa, "A System Identification Approach for Video-Based Face Recognition," Proc. of the International Conference on Pattern Recognition, Aug. 23-26, 2004, Cambridge, UK.
International Preliminary Report on Patentability on PCT/US2008/006545, dated Dec. 1, 2009.
International Search Report and Written Opinion for PCT/US2008/006545, dated Nov. 28, 2008.
Non-Final Office Action on U.S. Appl. No. 14/486,254 dated Dec. 4, 2015.
Non-Final Office Action on U.S. Appl. No. 11/755,192, dated Oct. 18, 2011.
Non-Final Office Action on U.S. Appl. No. 13/315,737, dated Jan. 17, 2014.
Non-Final Office Action on U.S. Appl. No. 13/315,737, dated Jan. 18, 2013.
Notice of Allowance on U.S. Appl. No. 11/755,192, dated Jan. 9, 2012.
Notice of Allowance on U.S. Appl. No. 13/315,737, dated May 27, 2014.
Notice of Allowance on U.S. Appl. No. 14/486,254 dated Jun. 7, 2016.
Office Action on Japanese Application 2010-510297, dated Oct. 29, 2013 (English translation not available).
Puccio, Michael, "Electrolytic Tilt Sensors and Inclinometers", Sensor Technology an Design, Sep. 2004, pp. 41-45.
Viola, M.J. Jones—"Robust Real-Time Face Detection" International Journal of Computer Vision, vol. 57, No. 2, May 2004, pp. 137-154.

* cited by examiner

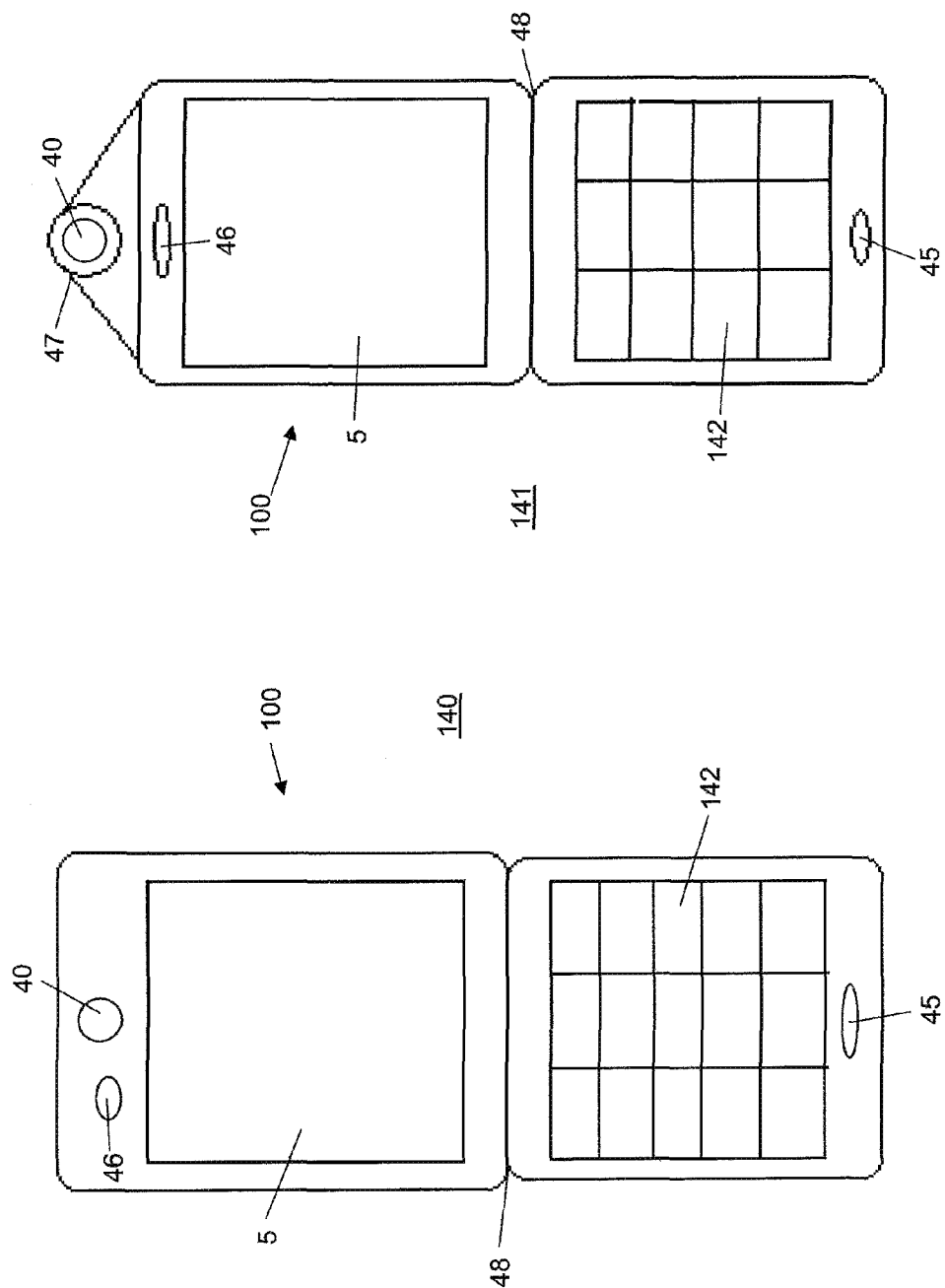

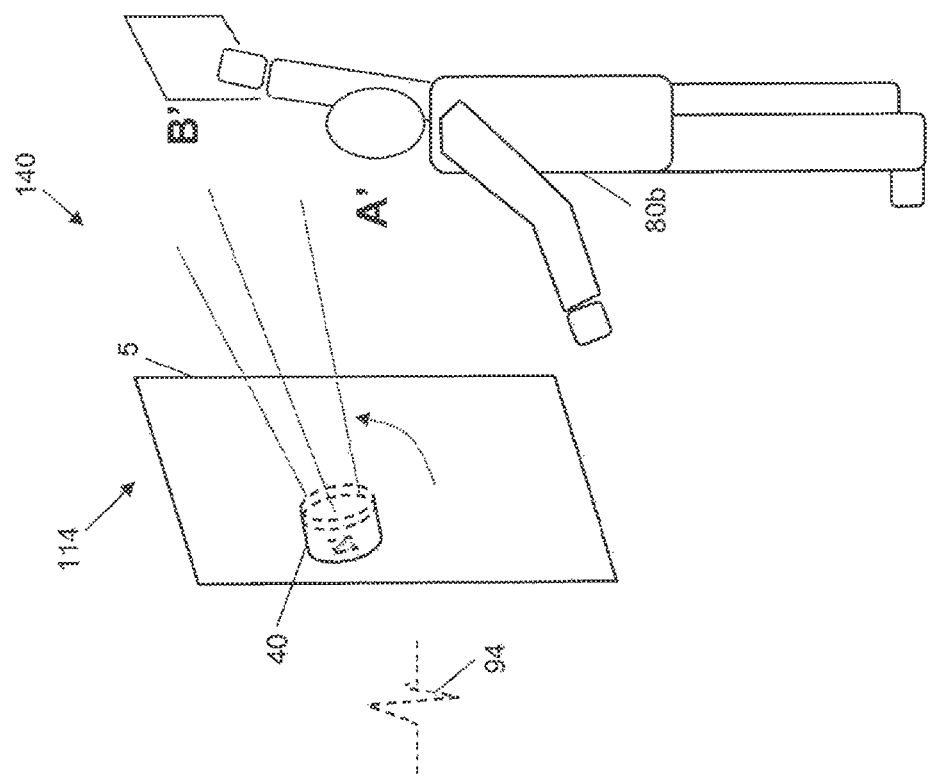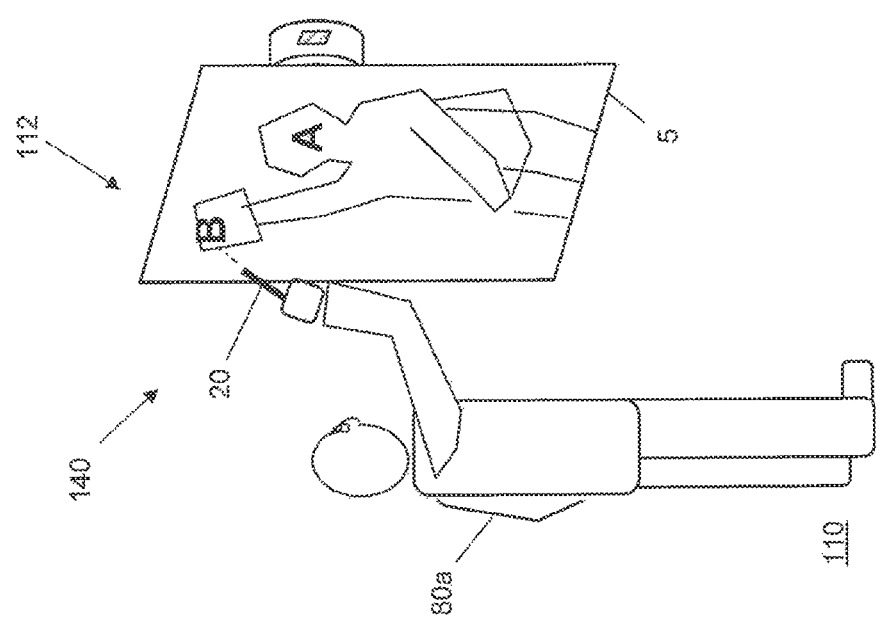
FIG. 4B

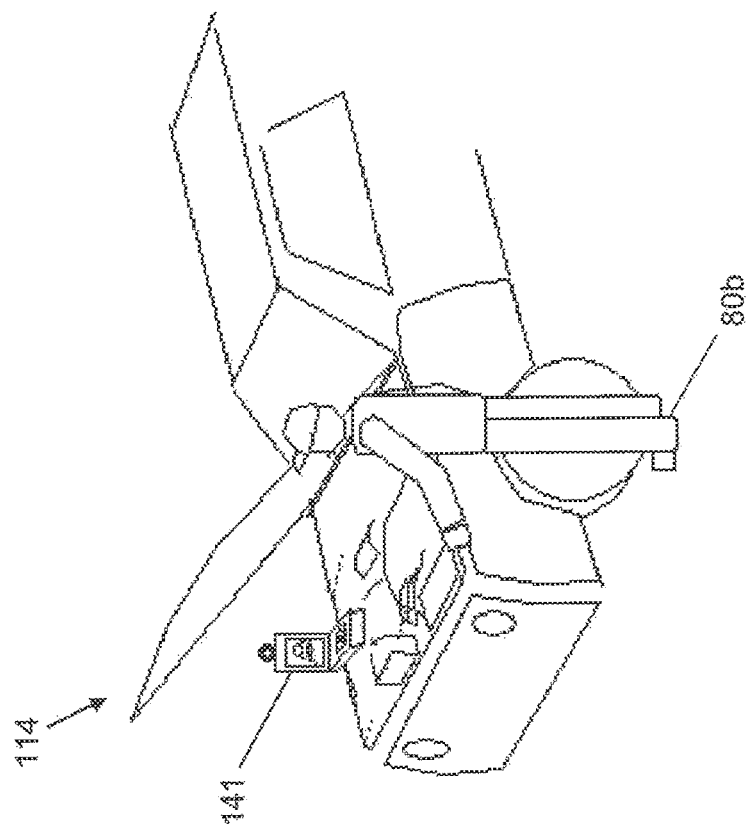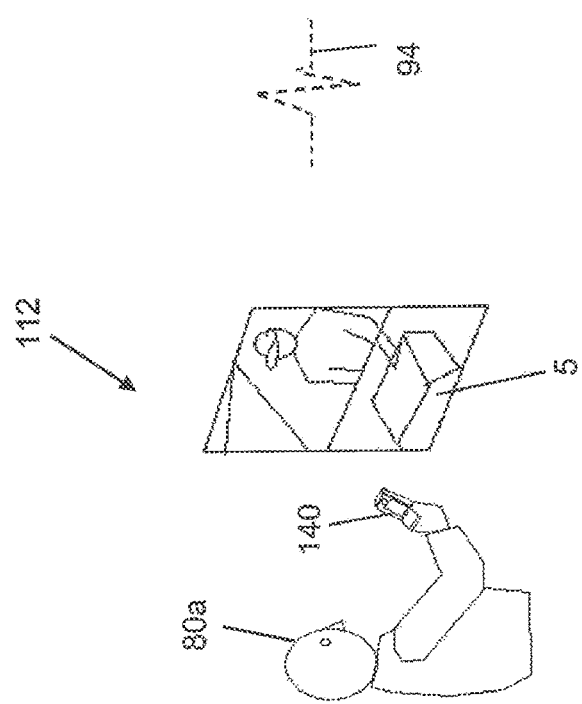
FIG. 5

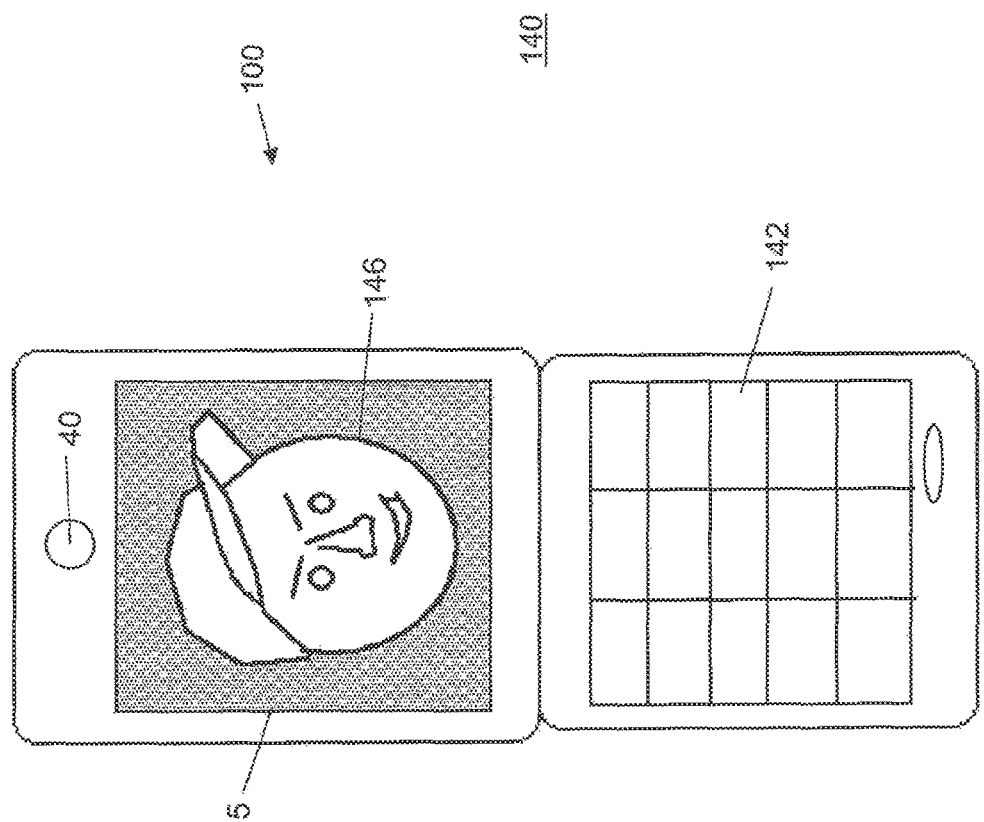

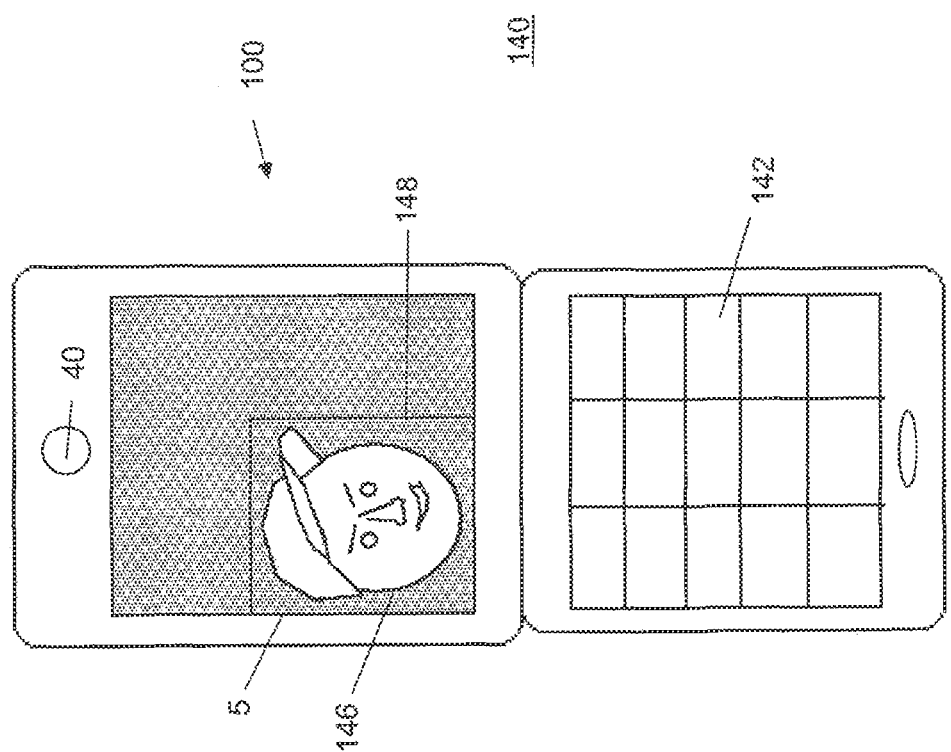

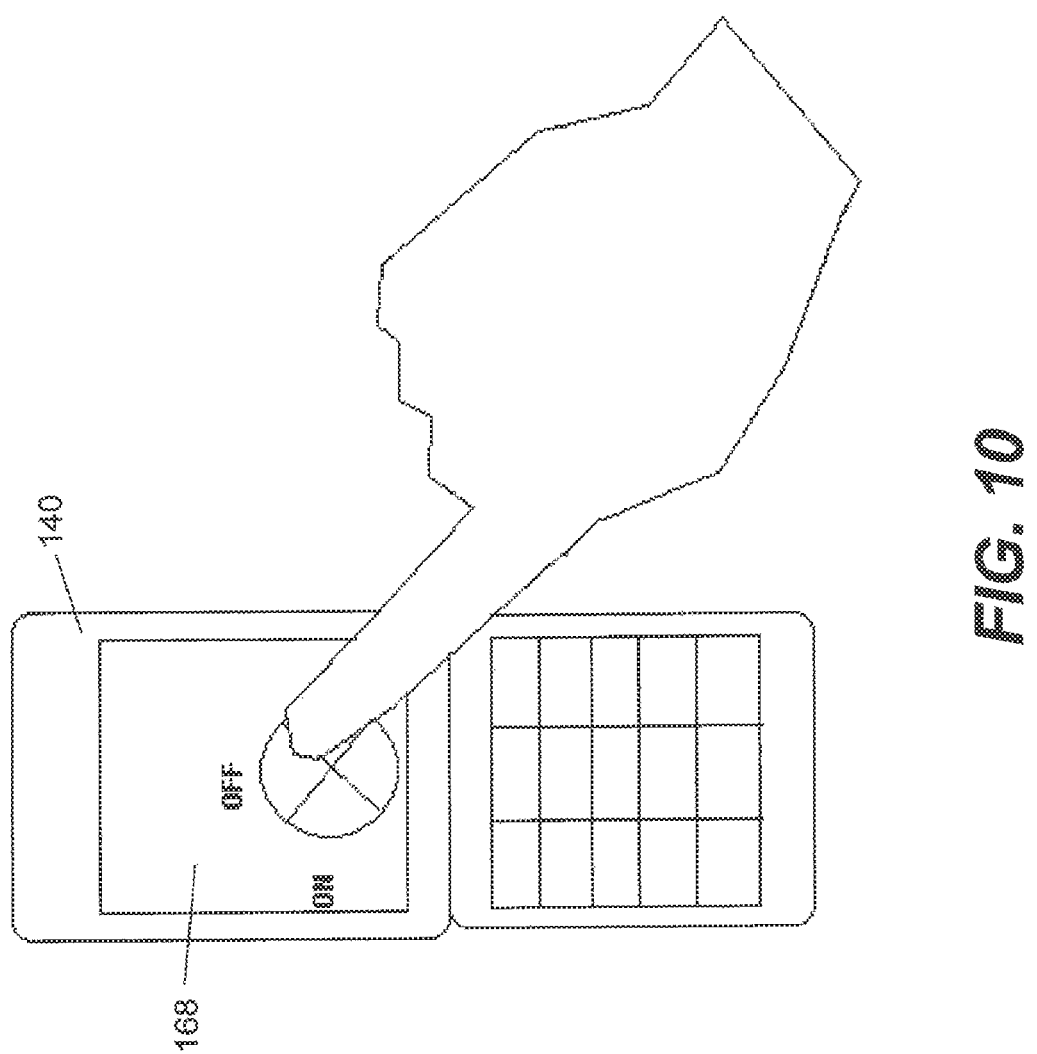

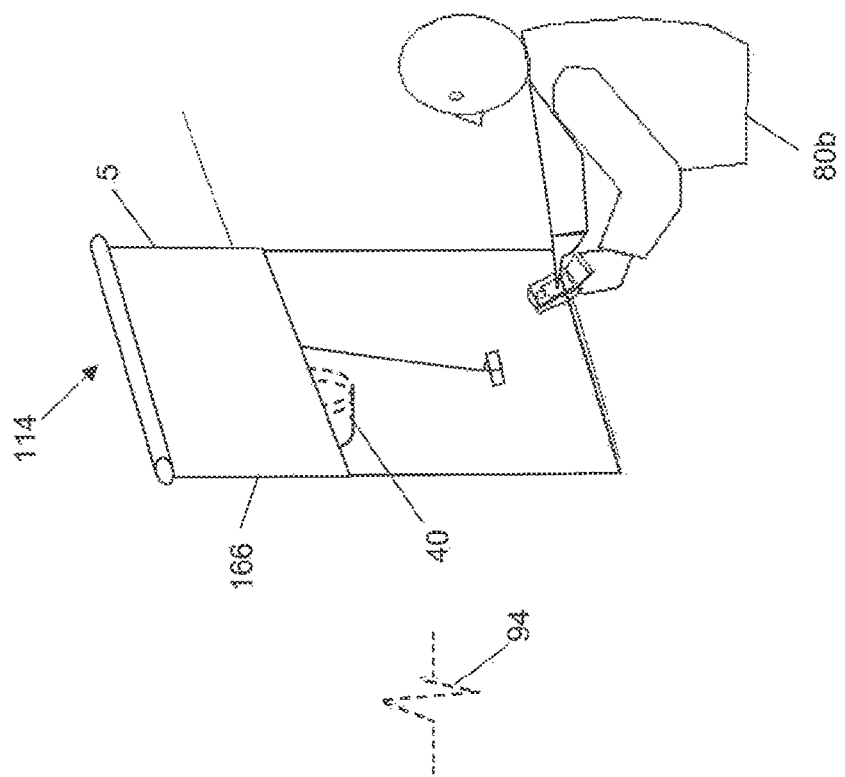
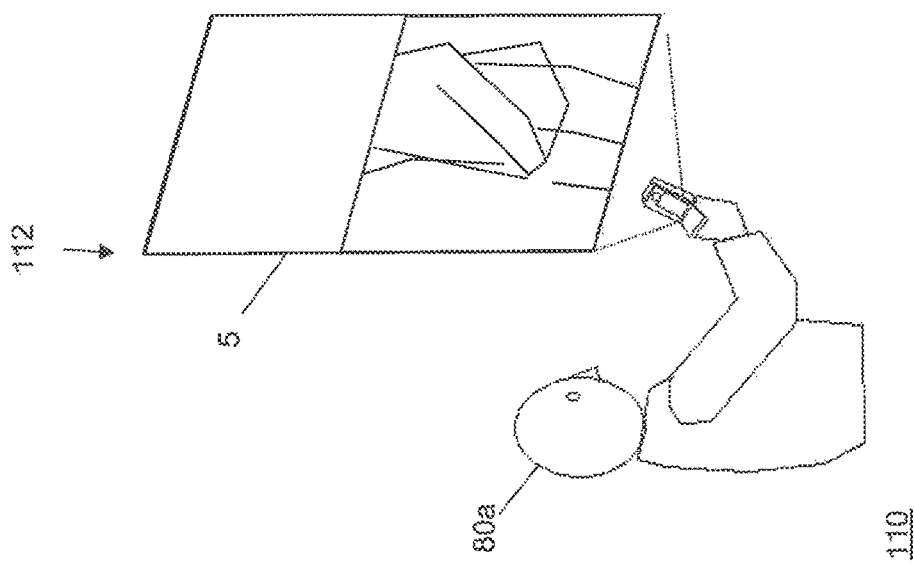
FIG. 11

FIG. 13A  IMAGE AT POOR CAPTURE ANGLE

FIG. 13B  UNDISTORTED IMAGE

PREVIOUSLY CAPTURED IMAGE OF THE PARTICIPANT USED AS A REFERENCE

PORTABLE VIDEO COMMUNICATION SYSTEM

CROSS-REFERENCE TO RELATED PATENT APPLICATIONS

This application is a Continuation of U.S. application Ser. No. 14/486,254, filed Sep. 15, 2014, which is a Continuation of U.S. application Ser. No. 13/315,737, filed Dec. 9, 2011, which is a Divisional of U.S. application Ser. No. 11/755,192, filed May 30, 2007, all of which are incorporated herein by reference in their entireties.

FIELD

The present disclosure generally relates to two-way video communication systems and more particularly relates to a portable two-way video communication system that is adapted to hand-held video communication devices.

BACKGROUND

Two-way video systems are available that include a display and camera in each of two locations connected by a communication channel that allows communication of video images and audio between two different sites. Originally, such systems relied on a setup at each site of a video monitor to display a remote scene and a separate video camera, located on or near the edge of the video monitor, to capture a local scene, along with microphones to capture the audio and speakers to present the audio thereby providing a two-way video and audio telecommunication system between two locations. Conventional systems are typically large, fixed in location, have a restricted ability to cope with changes in scene focus, and do not necessarily provide natural communication. Moreover, conventional designs do not take advantage of available, portable display and capture systems such as are found in cellular telephones and similar hand-held devices.

Referring to FIG. 1, there is illustrated a typical prior art conventional two-way video communication system wherein a first user 20a at a first location views a first display device 14a. A first image capture device 10a, which can be a digital camera, captures an image of the first viewer 20a. If the image is a still digital image, it can be stored in a first still image memory 30a for retrieval. A still image retrieved from first still image memory 30a or video 4841-6861-0104.1 images captured directly from the first image capture device 10a will then be transmitted using a first communication channel 60 to a second display 14b where a second user 20b can view the captured image(s) on a display 14b. Similarly, a second image capture device 10b, which can be a digital camera, captures an image of second viewer 20b at a second location remote from the first location. The captured image data is transmitted through a second communication channel 62 to the first display 14a for viewing by first viewer 20a. The captured image data can also be stored in a second still image memory 30b for retrieval. The first communication channel 60 may be the same as the second communication channel 62.

Although such two-way video communication systems have been produced and used for high-end teleconferencing and other two-way video communications applications, there are some significant practical drawbacks for incorporation in a portable and hand-held video communication systems. Expanding the usability and quality of such portable video communication systems has been the focus of much recent research, with a number of proposed solutions directed at making it easier to provide two-way video communication. However, numerous problems continue to exist that are peculiar to the hand-held environment, such as image quality, ease of use, security, and privacy, that have not yet been adequately addressed.

One relevant problem for hand-held communication devices, are their inability to compensate for observer motion or vibration, poor image capture angles, and changes in the field of view.

U.S. Pat. No. 7,058,433 entitled "Mechanism for Ergonomic Integration of a Digital Camera into a Mobile Phone" to Carpenter, discloses a pivot provided between the display and the camera sections of an imaging device so that the camera can be better set up for capture during video communication. U.S. Patent Application Publication 2006/0148517, entitled "Video Conference Feature for a Mobile Communication Terminal" by Yu, discloses a display is that can be tipped up and the image inverted for better viewing during video communication. However, neither Carpenter nor Yu address the problem of poor capture angle produced by the low hand position (see FIG. 12) that is commonly used by people when looking at the handheld display of a mobile phone camera or other portable imaging and display device.

U.S. Patent Application Publication No. 2004/0070666 entitled "Method and Apparatus for Transmitting a Video Image", by Bober, discloses use of face detection for locating the first participant's face in the captured image and cropping the captured image prior to transmission to the second participant to help keep the face centered in the image as viewed by the second participant. This approach does not address poor capture angle or image shake produced by hand jitter as is commonly encountered when the portable imaging and display device is operated with one hand while the user is in motion. Additionally the method disclosed by Bober does not suggest alteration of the background to improve privacy or reduce data transmission rate.

Privacy issues are particularly relevant for a portable imaging device as it is being transported from one environment to another. U.S. Patent Application No. 2004/0257431 entitled "Video Conferencing Apparatus and Method", Girish discloses an iris shaped cover for the imaging device to provide visual confirmation that the video capture capability is disabled. Similarly, Girish discloses a light to indicate that video capture and audio capture are enabled. However, this approach does not provide a sufficiently versatile approach wherein the user would like to show his face during video communication without showing the background from the environment or would like to select a different background that is more suitable for the recipient of the image.

The combination of image capture, image processing and wireless communication capabilities in a hand-held communication device such as a cellular phone with an embedded camera make it uniquely suited for use as a portable security system based on imaging and audio. Face recognition algorithms based on image comparison with sophisticated image processing systems is taught by P. Viola, M. J. Jones, "Robust Real-Time Face Detection," International Journal of Computer Vision, Vol. 57, No. 2, May 2004, pp. 137-154. A good article describing face recognition techniques for video imaging is contained in the article by G. Aggarwal, A. Chowdhury, R. Chellappa, "A System Identification Approach for Video-Based Face Recognition", Proc. of the International Conference on Pattern Recognition, 23-26 Aug. 2004, Cambridge, UK.

Further, the use of biometric information in a dedicated security system is well known in the art as well, U.S. Pat. No. 6,853,739 to Kyle discloses a system that is based on the use of captured biometric information (face, fingerprint, hand, iris) that is compared against a database of many individual sets of biometric information, including face recognition, to verify the identity of an user from a group of individuals. The system as disclosed by Kyle utilizes a remote central processing unit on a computer network to perform the data analysis for comparison of the captured biometric information to the many individual sets of biometric information from the group of individuals. Thus, the system as described by Kyle is a dedicated security system where the biometric capture device must be setup to communicate with a central processing unit wherein the captured biometric information is compared to the database with an algorithm to make a decision regarding the identity of the user.

Similarly, Akiyama in U.S. Pat. No. 6,724,919, discloses a method for a system that uses a face identification algorithm on a computer system to verify the identity of the user and if a new user is detected, then a preset process is executed to change the computer setup to that desired by the new user. Thereby, Akiyama teaches the use of a face identification system to improve the operation of the computer alone and does not anticipate a portable personal security system.

While both Kyle and Akiyama disclose useful techniques for verification of the identity of a user, neither Kyle nor Akiyama teach simplified techniques that would be implementable in a hand-held communication device. In addition, Kyle and Akiyama do not teach the use of a portable imaging and display device as a versatile, self-contained personal security system.

Portable imaging and display devices or systems require special solutions due to their small size, limited capabilities, inherent problems, and high mobility. Conventional solutions do not address the problems of vibration and capture angle induced by one-handed operation of a portable imaging device nor do these solutions adequately address the problems of privacy, background suitability, or security for effective communication. In addition, a portable personal security system wherein the user identification can be verified and the identification information can be wirelessly communicated to other devices is not disclosed.

SUMMARY OF THE DISCLOSURE

The present disclosure aims to provide improved apparatus for video communication with a portable video system that provides improved video quality and is suitable for use in portable devices.

In accordance with one aspect of the disclosure there is provided a hand-held portable wireless display and digital capture device, comprising:

a. a digital image capture device for capturing digital video and/or still images;

b. a device for transmitting and receiving wireless communication of digital video and/or still images over a communication network; and c. an image compensating device for compensating for poor image capture conditions of a digital image captured by the image capture device so as to create a modified image for transmission over the communication network.

In accordance with another aspect of the present disclosure there is provided a method for adapting a display image on a hand-held portable wireless display and digital capture device, comprising the steps of:

a. capturing a digital video and/or still image of a user;

b. adjusting the captured digital image in response to poor image capture conditions in an image captured by the image capture device so as to create a modified captured digital image: and c. transmitting the modified captured digital image over a wireless communication network to a second hand-held portable wireless display and digital capture device.

In accordance with yet another aspect of the present disclosure there is provided a method for adapting a displayed image on a hand-held portable wireless display and digital capture device for receiving and transmitting digital images over a communication network, comprising the steps of:

a. capturing a digital image of a user with the hand-held portable wireless display and digital capture device;

b. adjusting the background of the digital image of the user so as to create a modified captured digital image that is to be transmitted; and c. transmitting the modified captured image over a wireless communication network to a second hand-held portable wireless display and digital capture device.

In accordance with yet still another aspect of the present disclosure there is provided a method for adapting a displayed image on a hand-held portable wireless display and digital capture device for receiving and transmitting digital images over a communication network, comprising the steps of:

a. capturing a digital video and/or still image by the a hand-held portable wireless display and digital capture device;

b. controlling what image is captured by the hand-held portable wireless display and digital capture device from instruction received from a second hand-held portable wireless display and digital capture device over the wireless communication network; and c. transmitting the captured image from the hand-held portable wireless display and digital capture device over a wireless communication network to the second hand-held portable wireless display and digital capture device.

In still another aspect of the present disclosure there is provided a method for adapting a displayed image on a hand-held portable wireless display and digital capture device, comprising the steps of:

a. capturing a digital video and/or still image by the a hand-held portable wireless display and digital capture device;

b. detecting motion of the a hand-held portable wireless display and digital capture device that affect the quality of the digital image being captured and automatically adjusting the captured digital image in response to the detected motion; and c. transmitting the adjusted captured digital image from the a hand-held portable wireless display and digital capture device over a wireless communication network to a second hand-held portable wireless display and digital capture device.

The present disclosure is directed to solving and/or minimizing the problems associated with the prior art, it being understood that the present disclosure may provide additional benefits not enumerated herein.

BRIEF DESCRIPTION OF THE DRAWINGS

In the detailed description of the disclosure presented below, reference is made to the accompanying drawings in which:

FIG. 3A is a plan view of a portable communication device made in accordance with the present disclosure used in the system of FIG. 2;

FIG. 3B is a plan view of a modified portable communication hand-held device made in accordance with present disclosure have directable image capture lens;

FIGS. 4A and 4B are diagrammatic representations illustrating use of a pointer in a system according to the present disclosure;

FIG. 5 is a diagrammatic representation showing another embodiment of a hand-held communication device made in accordance with the present disclosure that uses directable capture that is controlled remotely by another participant;

FIG. 8 shows a display of a hand-held device made in accordance of a recipient illustrating background removal;

FIG. 9 shows a display with a window that shows the image as transmitted from the transmitting hand-held communication made in accordance with the present disclosure;

FIG. 10 shows on-screen user controls of a hand-held device made in accordance with the present disclosure;

FIG. 11 shows a privacy option for a hand-held communication device made in accordance with the present disclosure;

DETAILED DESCRIPTION OF THE PREFERRED EMBODIMENTS

Figure 1:
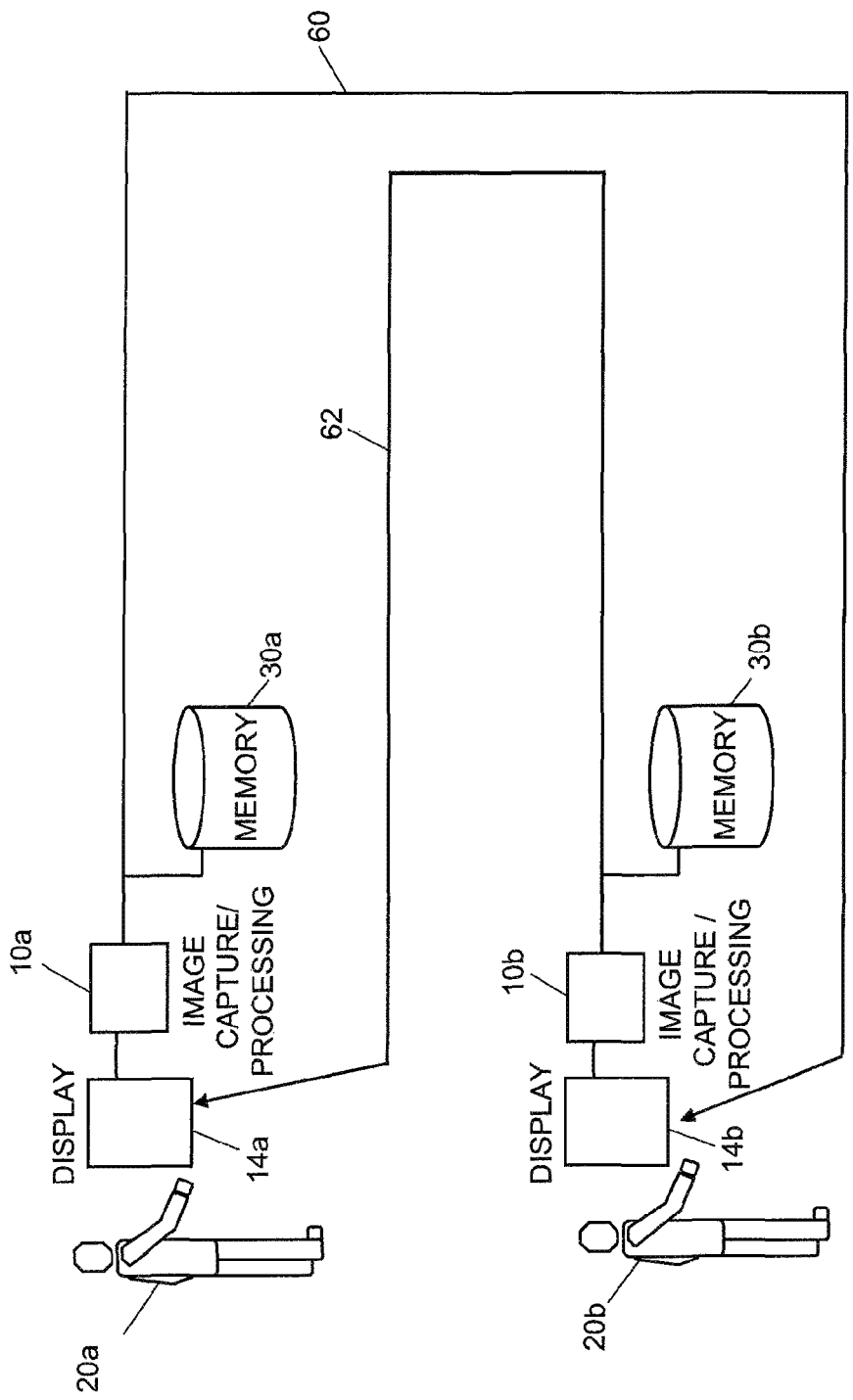
FIG. 1 is a diagrammatic representation of a conventional telecommunication system.
Figure 2:
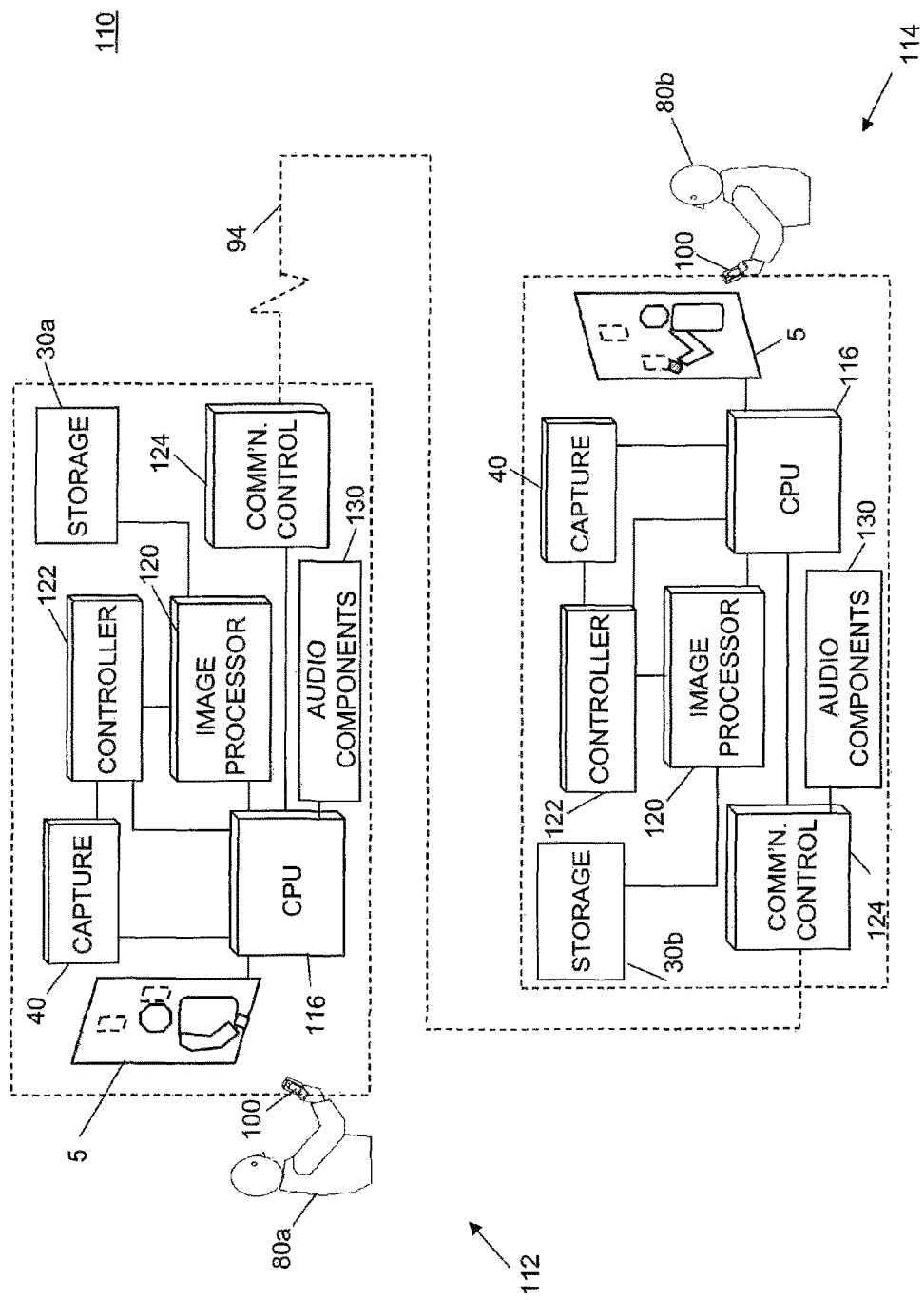
FIG. 2 is a diagrammatic representation of a hand-held communication system according to the present disclosure.

Referring to FIG. 2 there is illustrated a two-way communication system 110 for hand-held portable devices for wireless communication between an user 80a using a hand-held portable wireless display and digital capture device 100 made in accordance with the present disclosure at a first site 112 and an user 80b at a second site 114 remote from the first site using a second hand-held portable wireless display and digital capture device 100 made in accordance with the present disclosure. In the embodiment illustrated in FIG. 2, hand-held portable wireless display and digital capture device 100 comprises a cell phone, however, the present disclosure is not so limited. Hand-held portable wireless display and digital capture device 100 may comprise any hand held device capable of wireless communication that can capture and display images, for example but not limited to digital cameras and personal digital assistants (PDAs). The hand-held portable wireless display and digital capture device 100 wireless connection is not limited to cell phone technology, any appropriate wireless technology may be employed, for example but not limited to, WiFi, Bluetooth or radio. The dashed line 104 shows some of the components provided as part of each hand-held portable wireless display and digital capture device 100.

A wireless network 94 connects the two sites 112 and 114. Hand-held portable wireless display and digital capture device 100 comprises a display 5 with one or more digital image capture devices 40 for capturing video and still images. A control logic processor (CPU) 116 is also provided that coordinates control of an image processor 120 and a controller 122 that provides display driver and image capture control functions. Controller 122 can provide commands to digital image capture device 40 (for example, a digital camera), for controlling view angle, focus, or other characteristics. Storage device 30 is provided for storage of digital image data captured by hand-held portable wireless display and digital capture device 100. A communication control apparatus 124 acts as interface to a communication channel, such as a wireless or wired network channel, for transferring image and other data from one site to the other.

In the embodiment shown in FIG. 2, each user 80a, 80b is visible on display 5 to the user at the other site, enhancing human interaction and improving communication capability. Image processing electronics 120 provide a number of functions for facilitating two-way communication, including improving the quality of image capture, improving the quality of images displayed at local display 5, and handling the data for remote communication. In the scope of the disclosure, poor image capture conditions are sensed, such as poor capture angle, low light, motion of the camera, motion in the scene or bright and dark areas, the captured images are then modified before being transmitted from the first digital capture device 100 to a second digital device.

It is noted that FIG. 2 shows a general arrangement of components that serve this particular embodiment; a number of variations can be envisioned, as will be appreciated by those skilled in the two-way communication arts. Digital image capture device 40 and display 5 are both integrated into each hand-held portable display and digital capture device 100. Other components for site 112 or 114, such as image processor 120, controller 122, CPU 116, and communication control 124 can also be integrated into hand-held portable wireless display and digital capture device 100. Audio capture and producing components 130 and other support components are provided, as is well known to those skilled in the audio/video communications arts.

It is to be understood that the particular hardware is not limited to that illustrated in FIG. 2 but can vary significantly. For instance, image capture device 40 can be separable from the hand-held portable wireless display and digital capture device 100 in some embodiments or the image capture device 40 may be integrated behind display 5 as described in commonly assigned U.S. Pat. No. 7,714,923 incorporated by reference herein. By integrating the image capture device into the display, the overall size of the imaging capture and display device can be reduced and the eye contact between the participants in the video communication can be improved.

Referring to FIG. 3A, there is illustrated a hand-held portable wireless display and digital capture device 100 of FIG. 2. Hand-held portable wireless display and digital capture device 100 has a display 5 for displaying an image received or captured by device 100 and a digital image capture device 40 (see FIG. 2) having a lens for capturing an image. The lens of digital image capture device 40 can be pointed at the user or any other scene desired by the user.

Hand-held portable wireless display and digital capture device 100 also has a microphone 45, speaker 46 and user controls 142 all integrated into a single compact device for capturing audio, playing audio and for controlling operation of the hand-held portable wireless display and digital capture device 100, respectively. In an alternate embodiment, not illustrated, the hand-held portable wireless display and digital capture device 100 has two image capture devices 40 wherein the lens of one image capture device 40 is pointed at the user of the device and the other lens is pointed away from the user to the surrounding environment. Both images could be displayed to the receiver in a split screen mode, for example. It is obvious that more than two cameras could be included to provide close-up (for example for thumbprint security purposes) or zoom capability other view angles, etc. In the embodiment illustrated in FIGS. 3a and 3b, hand-held portable wireless display and digital capture device 100 comprises a first body section 134 that is rotatably mounted to a second body section 136 by a hinge 48. It is to be understood that other forms are possible without a hinge 48 or with the controls 142 built into the display wherein the display is a touchscreen. Alternately, the image capture device 40 can be used to detect gestures of the viewer 80a to provide control inputs to the hand-held portable wireless display and digital capture device 100 that are similar to those inputs provided through the control 142.

FIG. 3B shows a modified hand-held portable wireless display and digital capture device 100 made in accordance with the present disclosure, like numerals indicating like parts and operation as previous discussed. In this embodiment of a hand-held portable wireless display and digital capture device 100 the image capture device 40 (or the lens of the image capture device 40) is placed in a swivel mount 47 that can be moved in section 134. A drive motor, not shown, may be provided so the image capture device 40 in swivel mount 47 can be directed by a user. The swivel mount 47 can be operated or controlled manually by the user 80a, or remotely by a second user 80b or automatically by another device, such as a computer that is in communication with device 100.

User/Operator Interface

As previously discussed, user interface 142 provides for user input. During video communication, it is anticipated that the users 80a and 80b upon viewing the image on the display 5 will want to change the area being viewed or zoom in on a portion of the image. This can be accomplished by several different methods within the scope of the disclosure.

There are several ways the users 80a and 80b can control or change the area being viewed. The users 80a and 80b can input the desired change in area to be viewed through user controls 142 (such as buttons, a mouse, a slider or a thumb wheel), through a touch screen, through gestures that are captured by the image capture device 40 and interpreted by the image processor 120, or through eye tracking. All of these techniques are well known and may be employed in the present disclosure.

Figure 4A:
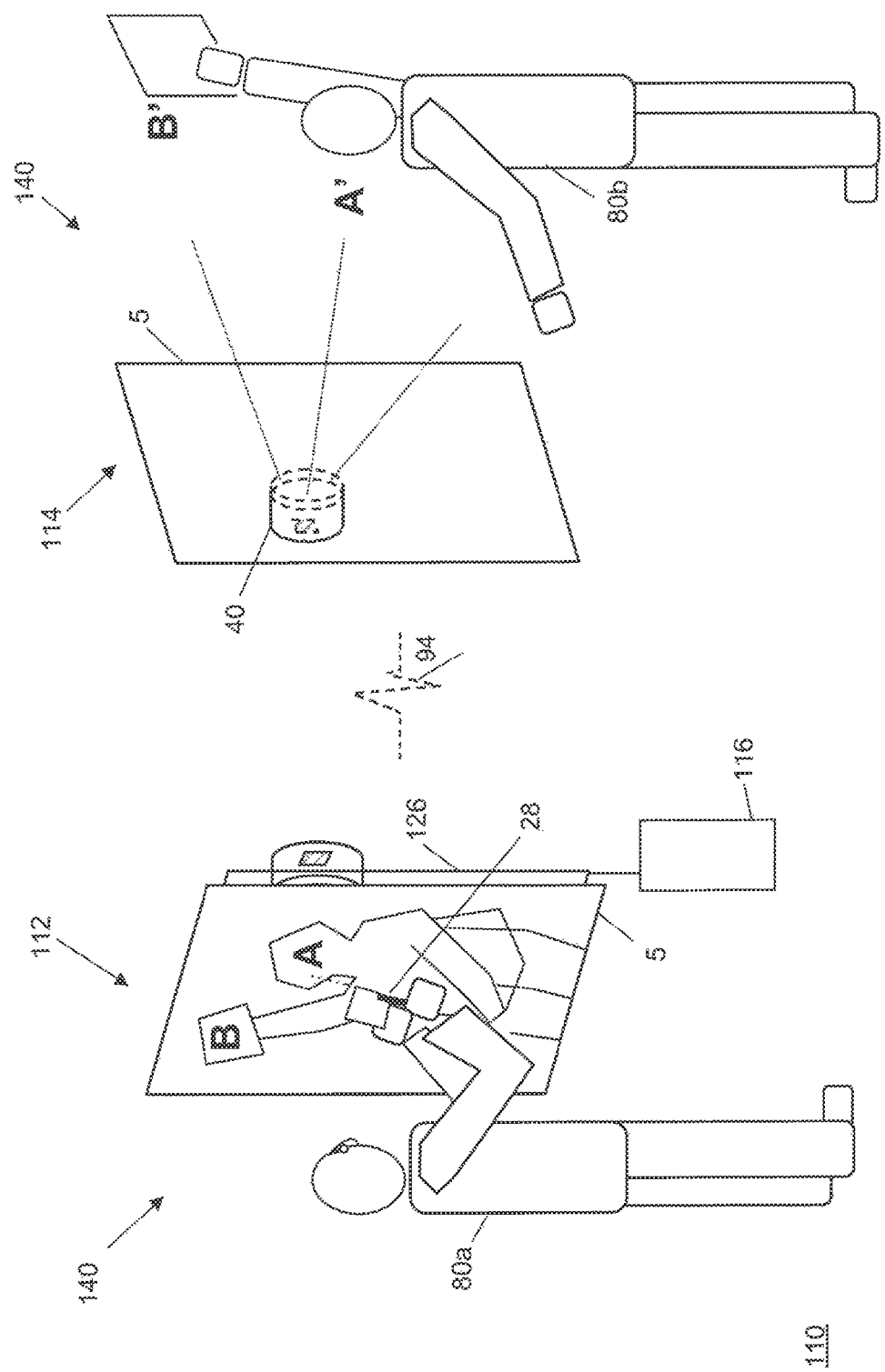

Referring to FIGS. 4A and 4B there is illustrated diagrammatic representations illustrating use of a pointer in a system according to the present disclosure. Here, user 80a is provided with a pointer apparatus 28 that can be used to point to a location of interest on a display, shown as location B in FIG. 4A. For ease of explanation and understanding, the display 5 is illustrated much larger than actual size with respect to user 86a. A separate prompt detection is provided for detection of the location of interest. In the embodiment illustrated, the display 5 is a touch screen capable of detecting a pointer, such as a pencil, pen, optical pointer such as a laser pointer, or other device, or a finger in contact with a touchscreen display 5. Based on the prompt provided by pointer 28 position, prompt detection apparatus 126 works in conjunction with control logic processor 116 to provide instructions over network 94 to the image capture apparatus at second site 114.

As shown in FIG. 4B, the image capture device 40 at remote site 114 responds to the prompt from pointer apparatus 28 by adjusting its view angle toward corresponding position B'. This allows remote control of viewing by a user 80b with respect to a scene at the remote location.

Other means for remote controlling of pointer apparatus 28 include, for example, a cursor manipulating device such as a joystick, trackball, or mouse, a remote control device, or some other mechanism for pointing to a portion of a displayed image on display 5. A touchscreen overlay can be used for receiving the viewer prompt. In the embodiment illustrated, the position of pointer apparatus 28 on display 5 is detected by the image capture device that is integrated into the display, reducing the overall space required for the user interface on portable display and digital capture apparatus 100. Still other types of prompts can include audible prompts. Algorithms that monitor the audio signal generated at first site 112 may detect these prompts. For example, a click or clapping sound, voice volume, voice pattern, key word, or other audible indicator serves as a prompt. Yet other methods of prompting may be based on analysis of physical posture, head movement, hand signals or gestures, motion, or facial expressions, for example. In this way, remote controlling instructions may be obtained by analyzing images received from the second device over the wireless communication network.

Advantages of the apparatus and method of the present disclosure for two-way video communication can be readily appreciated. For example, with reference to FIG. 5, user 80a at first site 112 using a portable communication device 140 can enjoy a wide range of visibility for communicating with viewer 80b at second site 114, including not only changing view angle, but also using zoom in, zoom out, focus adjustment, image cropping, freezing the image, or providing a measure of defocus outside of an area of interest, among other imaging functions. In addition, other features such as changing lighting levels, increasing or decreasing volume, or altering audio bass/treble tone sensitivity can also be obtained using this type of prompt/response sequence. Also as previously discussed, it is possible to provide remote control of the field of view contained in the image portable communication device with directable capture 141, wherein for example, the image capture device 40 may be installed in a swivel mount 47 so the image capture device 40 (or the lens of the image capture device is directable. Those skilled in the art will recognize that the portable communication device with directable capture could also include a directable pointer such as laser pointer to aid in the level of communication possible between user 80a and 80b.

Figure 6:
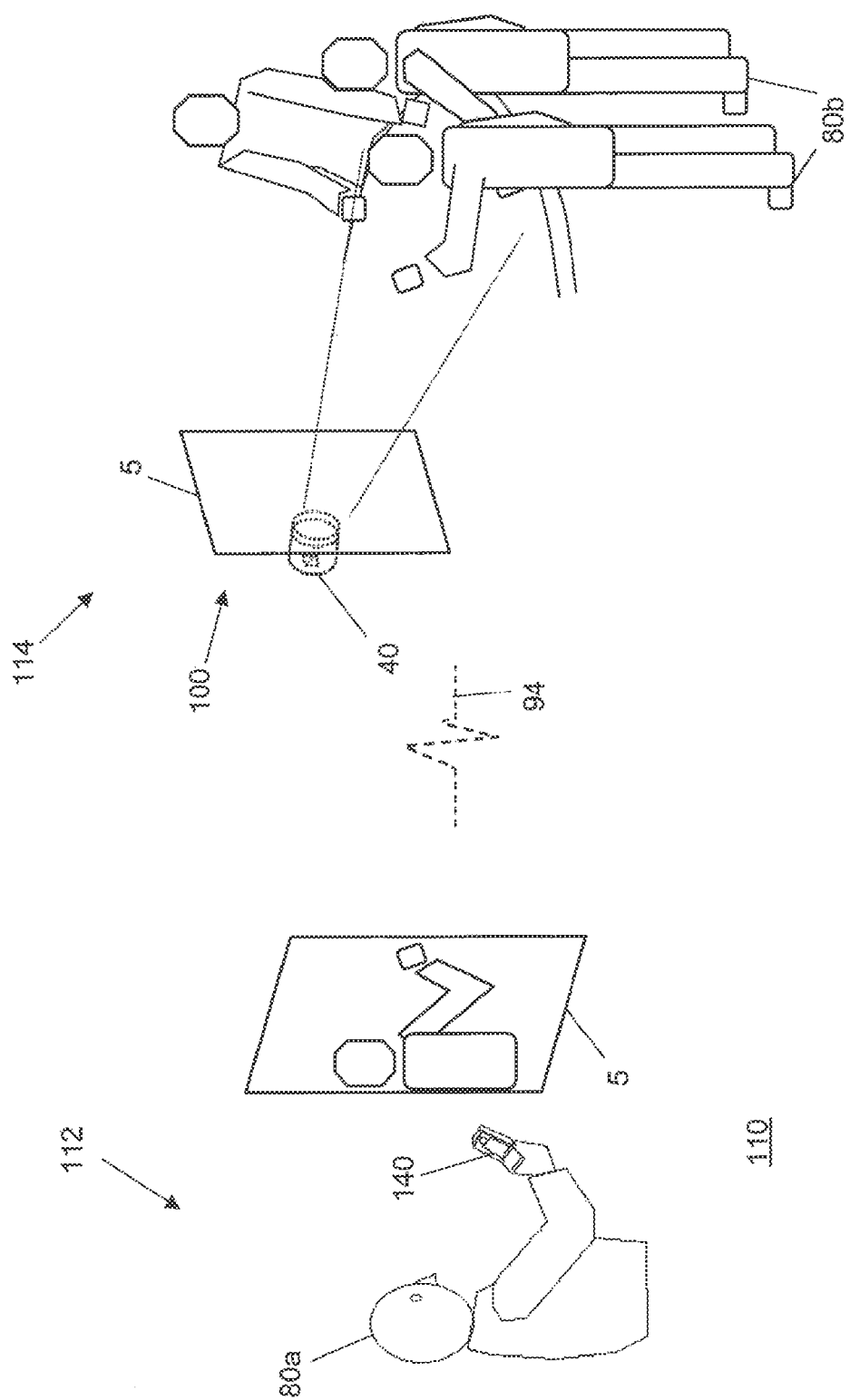
FIG. 6 is a diagrammatic representation showing use of a portable communications device made in accordance with the present disclosure in a teleconferencing application.

As shown in the teleconference application of FIG. 6, user 80a at first site 112 can interact with multiple users 80b at second site 114, zooming in or out and panning as needed in order to address other individuals singly or collectively. Alternately, user 80a may have multiple displays 5 digital capture apparatus 100, making it possible to view, at one time, scene content from multiple capture devices 40 at second site 114.

Privacy

Figure 7A:
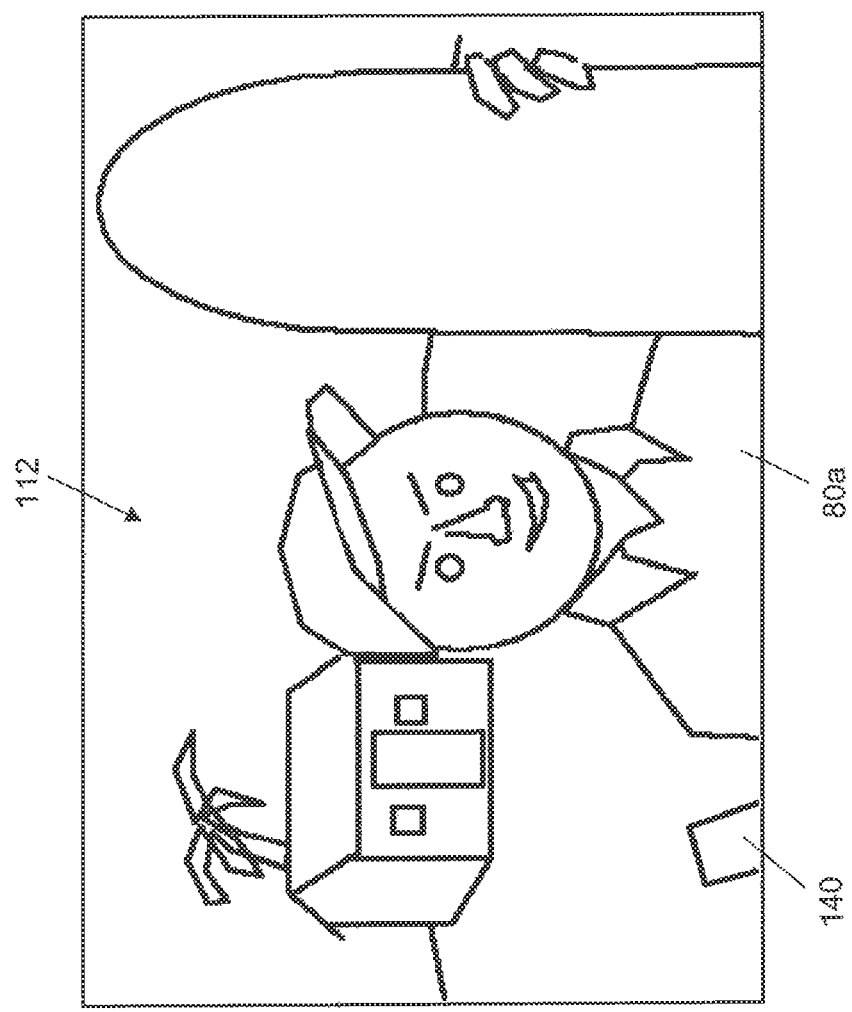
FIGS. 7A and 7B show an exemplary sequence of images to be viewed by a recipient illustrating background removal.
Figure 7B:
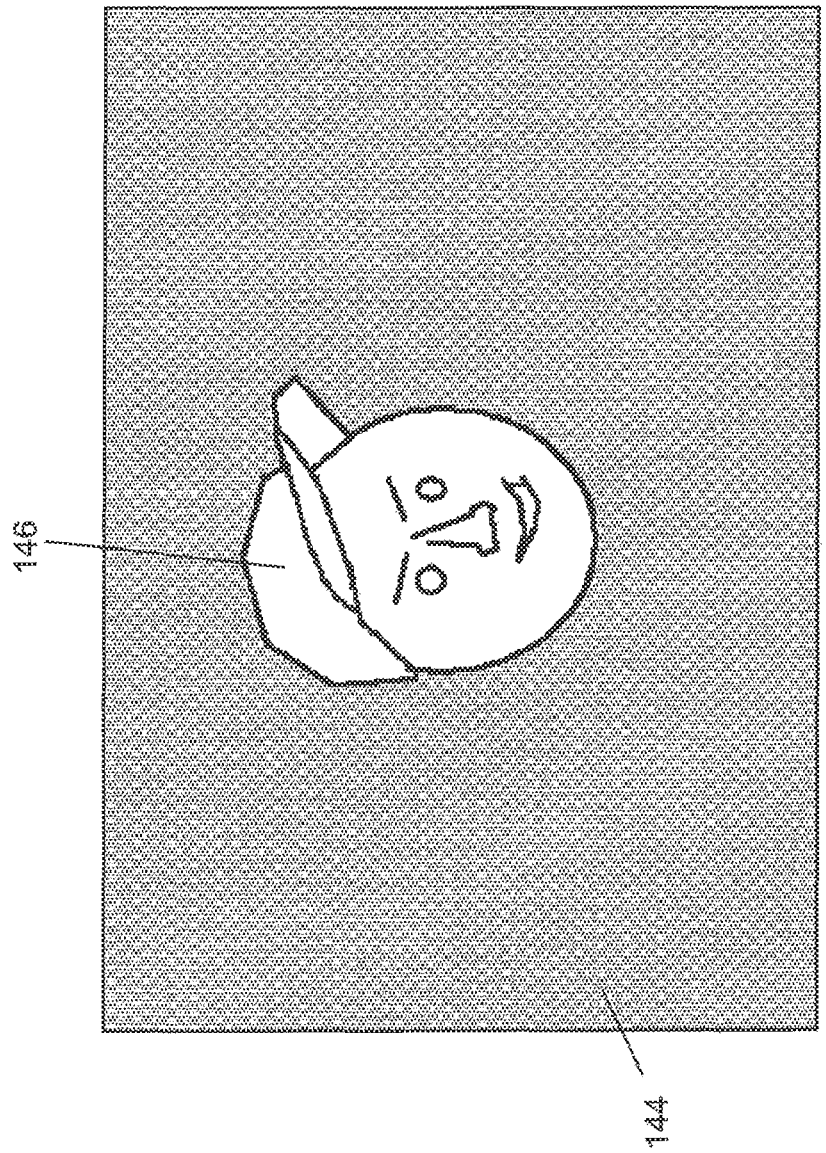

Methods to restrict image capture are particularly important for a portable imaging and display device where in certain cases it will be desirable to eliminate portions of the image captured at site 114 by the second hand-held portable wireless display and digital capture device 100 prior to transmission of an image to the first hand-held portable wireless display and digital capture device 100 at site 112. For example if user 80*b* were in a location or circumstances not favorable for unconstrained image capture, such as a locker room or other environment where privacy concerns exist, the allowed image capture area can be constrained or the background image surrounding the image of user 80*b* can be replaced to form a modified image which is then transmitted to the first hand-held portable wireless display and digital capture device 100 at site 112. FIGS. 7A and 7B show one example of background replacement.

In one privacy embodiment the image capture area is constrained to just the face of the user and/or participant 146 and the background image is replaced by a uniform neutral background 144, such as a gray color, leaving only the first participant's face 146 in the modified image transmitted to the second hand-held portable wireless display and digital capture device 100, as shown in FIG. 8. In this case, the face of the participant is detected and preserved in the modified image while all other detail in the modified image is replaced by a uniform neutral color. Face detection is well known to those skilled in the art (face recognition software can be obtained from Visionics Corporation, Jersey City, N.J. and is described in U.S. Pat. No. 6,111,517) either by skin color, a change in contrast, by identification of eyes and mouth or by the general face shape.

In another privacy embodiment, the background image is replaced with a different background image to give the illusion that the first participant is located at a different location. In this case, the face is detected (and in an alternate embodiment, the body of the user is detected as well) and all other detail is replaced by a different image to form a modified image wherein the background image is obtained from a previously stored image on the hand-held portable wireless display and digital capture device 100 or as captured by another image capture device 40 or as obtained from an external source. In accordance with the present disclosure, any type image may be used; for example, but not by way of limitation, a still image or a video image may be used for the background image. However, considering the limited space for image storage 30 and the limited image processing capability that is typical of a hand-held portable wireless display and digital capture device 100, the disclosure envisions that a still image would be used for the background as selected from a library of images in the storage 30 or as captured of the local environment at the beginning of the communication session or captured of the local environment when requested by one of the participants. A further advantage of using a still image as the background in the modified image is that the data transmission rate is reduced since the still image only needs to be transmitted once. In this case, the background image is transmitted from the first device to the second device and stored on the second device, the face image would then be continuously transmitted from the first device to the second device during the communication session and the modified image showing the face image over the background image would be continuously constructed within the second device and displayed on the second device. Alternately or in addition thereto, by using a still image to reduce the transmitted data rate of the background, a higher resolution image of the first user 80*a* face can be transmitted from the first device to the second device without encountering bandwidth limitations. An image or video already resident on the receiving device can also be used as a background, thus eliminating the need for transmitting that portion of the image altogether.

In a further privacy embodiment of the present disclosure, as shown in FIG. 9, a portion of the display may be used in a split screen configuration to enable the first user to view a verification image composed from the modified image being transmitted to the second user, within a window 148 that forms a portion of the displayed image. The verification image enables the first user to visually verify what the modified image being transmitted to the second participant looks like in terms of image content such as face location, background, zoom, brightness, pointing and privacy features. Those skilled in the art will recognize that alternately, the verification image from the first site 112 can be displayed on the display 5 in an alternating fashion with the image received from the second site 114 during the communication session. The verification image can be displayed in an alternating fashion automatically or when requested by the user. FIG. 10 shows on-screen controls 168 for accepting user commands for privacy settings in one embodiment.

In a still further privacy embodiment, an opaque screen is provided to cover the image capture device in a way that makes it easy for the first participant and others in the area to verify that the image capture has been disabled. FIG. 11 shows an embodiment in which second user 80*b* at site 114 is able to disable image capture using a screen cover 166 that displays at remote site 112. As shown in FIG. 11, cover 166 obscures image capture device 40. In the more general case, any number of methods for disabling either or both display and image capture functions at a site or portions of the site can be provided, including the use of opaque covers, a rotating image capture device 47 with a position wherein the lens of the image capture device 40 is blocked or software controls. Alternatively, the sending hand-held portable display and digital capture device 100 may simply disengage the image capture device 40.

Image Stabilization

Figure 12:
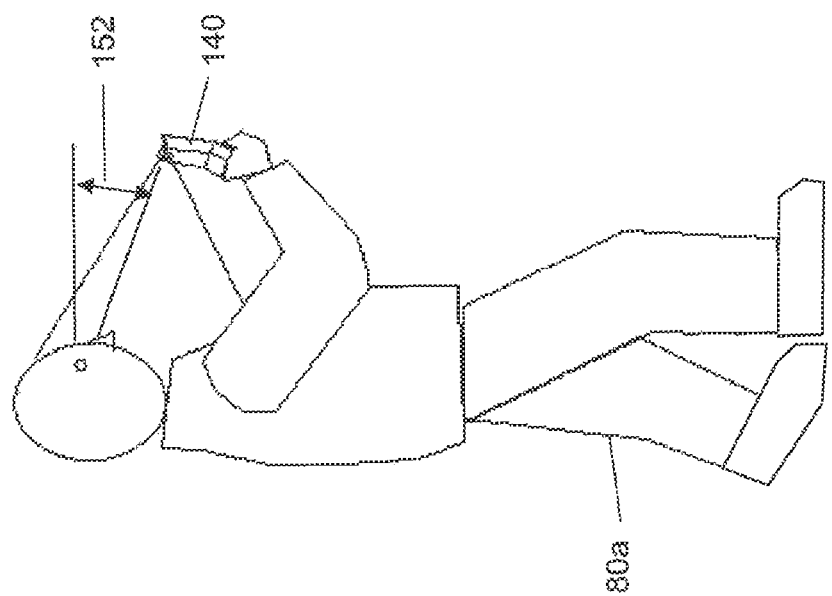
FIG. 12. shows a user using a personal communications device made in accordance with the present disclosure while walking.

As shown in FIG. 12, in typical use, viewer 80*a* may be walking or otherwise moving about while holding the portable communication device 140 in one hand, causing an amount of jitter, among other problems, with the images obtained from hand-held portable wireless display and digital capture device 100. As a result, a video image captured from hand-held portable wireless display and digital capture device 100 appears to be "jumpy" or otherwise unsteady. To help compensate for this type of condition, the present disclosure provides optional image stabilization that can be applied to the captured image during video communication.

Jitter can be detected in a number of ways, either by analysis of successive captured video image frames or using a sensor integrated into hand-held portable wireless display and digital capture device 100. A variety of techniques for image stabilization may be employed as known by those skilled in the art, such as optical image stabilization performed by optical components themselves, or digital image stabilization, which is performed during image processing immediately after capture. Jitter can be sensed by an accelerometer, a gyroscope or by analyzing a series of digital images. One suitable embodiment for digital image stabilization is that described by Deever in United States patent publication No. 2006/0274156.

Image Distortion Compensation

Figure 13:
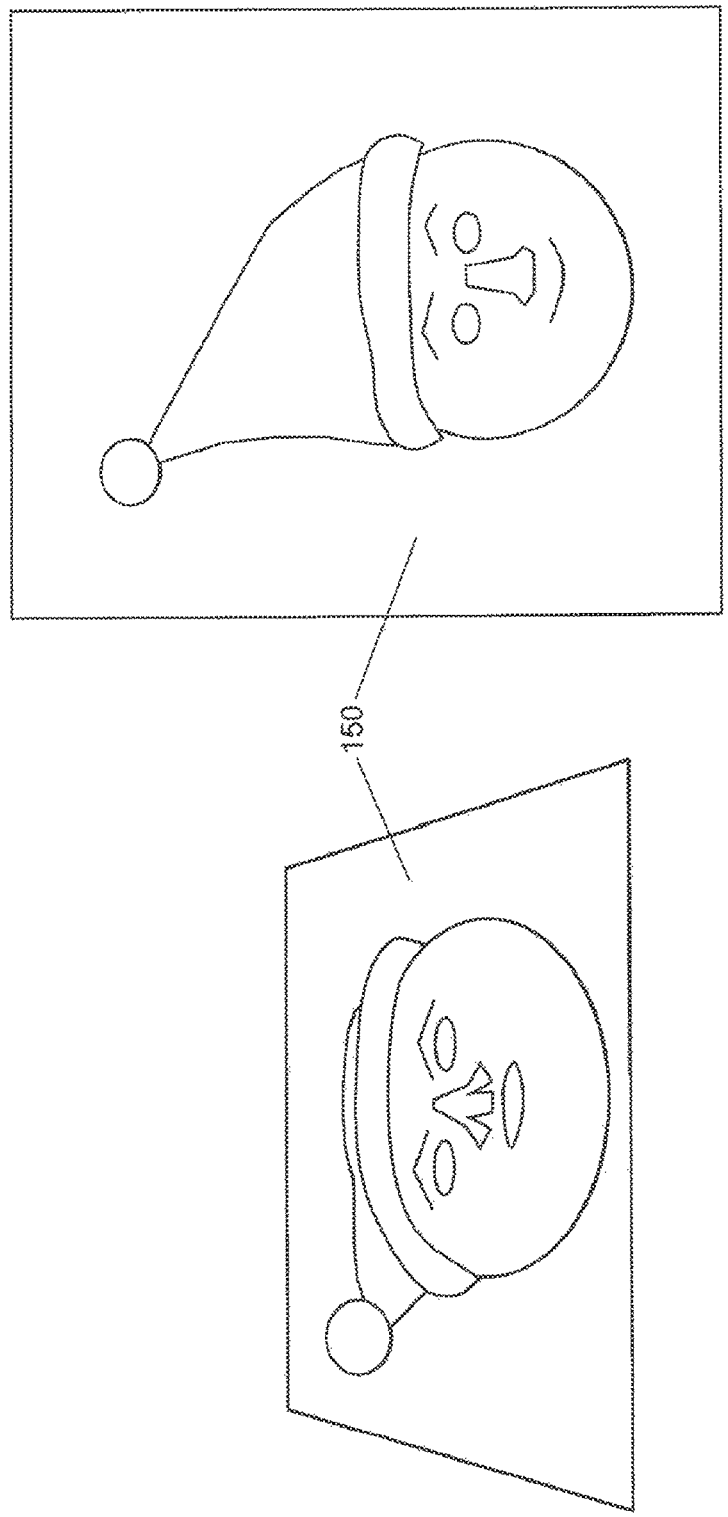
FIG. 13A shows image distortion created by a poor capture angle.
FIG. 13B shows a corrected image of distorted image of FIG. 13A.

Referring to FIG. 12, there is illustrated an user 80 using a personal communications device 10 made in accordance with the present disclosure with the user using a hand-held portable image capture and display device 100 while walking. In the embodiment illustrated the hand-held portable wireless display and digital capture device 100 comprises a cellular phone. The common technique for using a cell phone is to hold it in one hand at a low angle while walking. Since the lens of image capture device 40 is adjacent to (or integrated into) the display, the low angle results in a poor image capture angle which produces a distorted image of the user's face from below. FIG. 13A illustrates this poor image capture angle problem. FIG. 13A shows the captured image resulting from the poor image capture angle and FIG. 13B illustrates an undistorted image. Various methods can be used to compensate for the poor image capture angle to produce an improved image that appears to have been captured from a better image capture angle that is more directly in front of the user.

In a first image compensation method, the compensated image is produced using angular calculations. The angular orientation of the capture apparatus can be sensed by a tilt angle sensor (not shown) as is well known in the art (as describe in an article on Tilt Sensors by Michael Puccio, "Electrolytic Tilt Sensors and Inclinometers", Sensor Technology and Design, September 2004) and used to determine the capture angle 152. Alternately, the tilt angle can be determined by the relative size and shape of the nose 150, including but not limited to the width, length, nostrils and septum, of the person in the image. Nose 150 size and shape is a sensitive indicator for determining the capture angle 152 as can be readily seen in FIGS. 13A and 13B. A captured image of a user can be compared to a stored image of the user that has been captured with a good capture angle or can be compared to a database of normal faces to determine the capture angle 152 based on relative size and shape of the nose 150. Wherein capture angle 152 is defined as the angle between the pointing direction of the digital capture device 100 and the pointing direction of the user's face and a good capture angle is defined as less than 10 degrees. In one approach, the relative length of the nose D3 is compared to the distance between the eyes D1 (or alternately the width of the face) in the image, using digital image processing, or as compared to a stored image with a good capture angle is used to provide a measure of capture angle 152 (see FIG. 14). In another approach, the size of the nostrils seen in the captured image compared, using digital image processing, to a stored image with a good capture angle (see FIGS. 13A and 13B) is used to provide a measure of capture angle 152.

Figure 14:
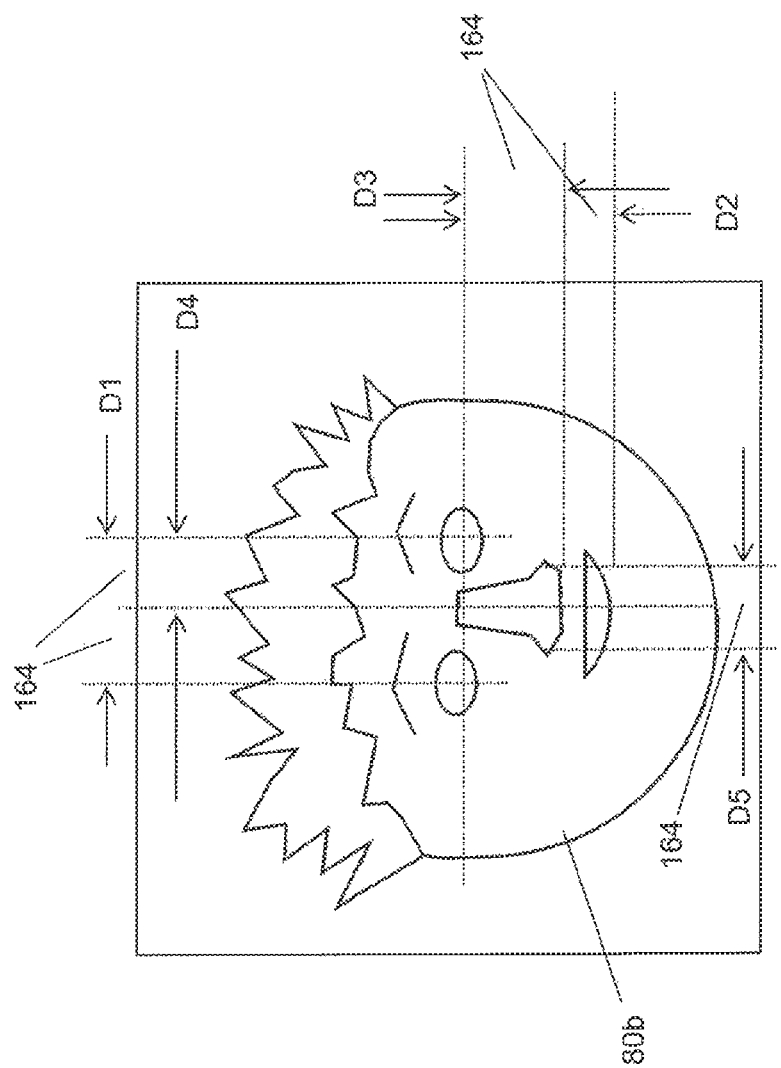
FIG. 14 shows a previously stored image of a face with some typical stored physical features.

After the capture angle 152 has been measured, in a first image compensation method, the captured image is stretched accordingly in one or more directions to compensate for a poor capture angle and produce an image that is more like an image that has been captured from a good capture angle. The stretch directions include longitudinal, transverse and skewed, wherein the bottom of the image is stretched laterally more at the top than at the bottom. The improved image may use a database of face dimensions to guide the image compensation process. The database of face dimensions can be obtained from a database of normal faces. The database of normal faces would include data on relative dimensions between identified features on the participant's face 164 as shown in FIG. 14, such as the distance D1 between the eyes and the distance D2 between the eyes and the mouth or the distance D3 between the eyes and the nose or the distance D4 between the nose and one eye or the distance D5 that is the width of the nose, for example. The relative dimensions of the image captured from a poor angle would then be adjusted vertically and horizontally to create a compensated image with relative dimensions that match the database of normal faces.

In a second image compensation method, a compensated image is produced by adjusting the image captured from a poor image capture angle to match the relative dimensions of a previously captured and stored benchmark image of the user. As shown by FIG. 14, there is illustrated an image of an user 80b that was captured from a good capture angle and the various measurements such as D1, D2, D3, D4 and D5 as previously discussed, that can be obtained and stored from such an image. Other relative dimensions other than or in addition to D1, D2, D3, D4 and D5 such as nose 150 relative size and shape may be used for comparing a captured image with stored benchmark image and then compensating the captured image.

Figure 15B:
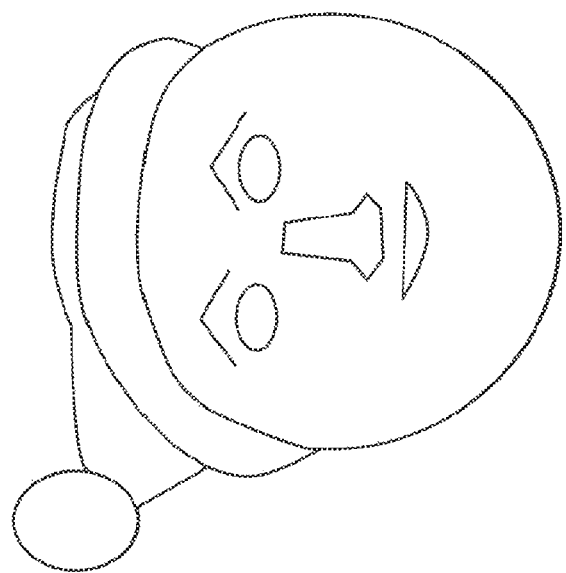
FIG. 15B shows replacement of a portion of the captured image of FIG. 15A using a portion of a stored image.
Figure 15A:
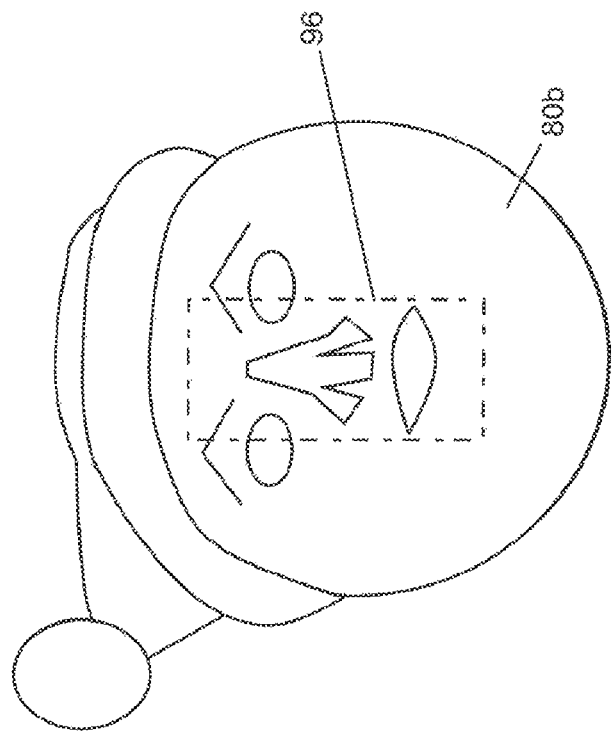
FIG. 15A shows a captured image illustrating poor capture angle.

In a third image compensation method, a compensated image is obtained by adjusting the image captured from a poor capture angle to match the relative dimensions of a previously captured and stored benchmark image (either a still image or a video) of the participant that was captured from a better image capture angle and then one or more portions 96 of the captured image are replaced by a corresponding portion of the previously captured and stored benchmark image (FIG. 14) to form a modified compensated image as shown by FIG. 15b. As shown in FIGS. 15a and 15b, one or more portions of details that are missing or blurred or otherwise distorted are replaced thereby producing an improved image of the face. As illustrated by FIG. 15a distorted portion 96 of the nose and mouth area of viewer 80b results from poor camera angle. Portion 96 is replaced from the stored image data (FIG. 14) for that user or other identified participant.

In a further image compensation method, a previously captured or constructed three dimensional model of the participant's face is used in conjunction with the image captured from a poor capture angle in order to produce an image of the face which has been rotated to correct for the poor image capture angle. With three-dimensional modeling, the shape of the face can be determined from the three dimensional model and the colors of the face such as skin tone and other characteristics can be determined from the image captured from a poor image capture angle. An exemplary method for obtaining a three dimensional model of an imaged scene is described by Yahav in U.S. Pat. No. 6,100,517.

In a still further image correction method, a previously captured image of a user 80b that has been captured with a good image capture angle is used as a base image for an avatar. The facial movement of the avatar is provided by facial changes in the captured video image from the poor image captured angle. The avatar then provides an improved image which appears to have been captured from a good image capture angle.

Those skilled in the art will recognize that still other image compensation can include rotation of the image, cropping, gain adjustments for bright areas or dark areas or automatic contrast or brightness adjustment, for example.
Security and Identification The use of biometric information to verify the identity of a person is well known in the art. As previously stated, both Kyle and Akiyama disclose systems which gather biometric information such as face, thumbprint and voice to verify the identity of an user by comparing the captured information to a database. The disclosure described herein teaches the use of a hand-held portable wireless display and digital capture device in a self-contained system to form a portable personal security device which can be used to verify the identity of the user and wirelessly transmit security information to other devices to control access to the other devices. The disclosure teaches the use of several improvements to biometric capture and comparison that enable more gross features to be used for verification of identity to simplify the signal processing required and together or individually make the verification of the user more suited to implementation in a hand-held portable wireless display and capture device.

In the first security embodiment, a database of previously captured security images of approved users is compared to the image of the current user of the imaging and display device. If the face of the current user does not match any of the previously captured security previously captured security images of approved users, a security alarm is then activated. Communication can be terminated, redirected, or monitored when a security alarm has been activated. While face recognition using a remote central processing unit is well known in the art, the disclosure further teaches that users could choose to include exaggerated facial expressions (such as sticking their tongue out, opening their mouth wide or winking) to personalize their security images and further enhance the degree of security. In this way, when the user begins operation of the hand-held portable wireless display and digital capture device 100, the user would have to provide the same exaggerated facial expression during capture of the security image to match the previously captured security images of security approved users and initiate operation. The addition of an exaggerated facial expression simplifies the verification of the user since more gross facial features are easier to identify when using a simplified image processor as is common in hand-held devices.

In a second security embodiment, the user places a thumb or other finger over the image capture device 40 of portable communication device 140 so that an image of a portion of the fingerprint of the user can be captured as a fingerprint image. The fingerprint image is stored and compared against a database of previously captured fingerprint images of approved users of the portable communication device 140. If the fingerprint image does not match any of the previously captured fingerprint images in a security approved database of fingerprint images, a security alarm is activated and the communication device can be disabled, redirected, or monitored. Fingerprint images based security is particularly well suited in portable communication devices 140 that have an image capture device 40 that is built into the display 5 as an integrated image capture and display device. To enable the image capture device to be used to capture an image of a thumbprint on the lens cover, the disclosure teaches the use of a focusing system with extended focal range to provide for short focal range imaging of the thumbprint on to a lens or onto a lens cover glass.

In a third security embodiment, the microphone 45 on the hand-held portable wireless display and digital capture device 100 is used to capture a spoken phrase which is compared against a previously spoken security phrase to verify the identity of the user based on the spoken phrase and the voice characteristics of the operator/user. The disclosure teaches that the spoken phrase be chosen by the user to personalize the security phrase and also simplify the level of signal processing required to verify the user.

In a preferred embodiment, one or more of the security embodiments are used together to further verify the identity of the user. As an example, the image of the user may be compared to the previously captured security images and the user would then have to speak a phrase, which is then compared to the security phrase for the phrase and voice characteristics. Only if the user is positively identified against the security image and the security phrase would the user be approved to initiate operation.

Security related identification of the user can also be used to condition operation characteristics of hand-held portable wireless display and digital capture device 100. In one embodiment, a profile of operational preferences is provided to control logic, so that hand-held portable wireless display and digital capture device 100 responds according to the preferences of a specific user.

Those skilled in the art will recognize that the security features in the portable device can be used to verify that the user is approved for operation of a hand-held portable wireless display and digital capture device 100 and to verify that the user is approved for use of any other devices that are linked to the hand-held portable wireless display and digital capture device 100. In this way, the hand-held portable wireless display and digital capture device 100 can be used as a versatile portable security verification system to provide security features associated with the identification of the user for other devices that are linked to a portable device either through wireless systems, infrared systems, radio systems or telephone systems. Wherein the other devices that benefit from a portable personal security system where access is controlled based on the identity of the user include but are not limited to: home, office, automotive, boats, banks, electronic purchasing systems and secure installations. In these cases, the portable communication device is used to verify the identity of the user and then transmit information to the linked device, which then operates in a manner consistent with the known identity of the user. This approval process includes but is not limited to: granting the approved limit of operation of the linked device; granting approval to make financial transactions; granting access to secure information; granting physical access to a site; allowing operation of a vehicle, etc. As an example, the hand-held portable wireless display and digital capture device 100 could be used to open a car door wherein the hand-held portable wireless display and digital capture device 100 first captures an image of the user to verify the identity of the user. Then provided the user has been approved to open the car door, the hand-held portable wireless display and digital capture device 100 wirelessly transmits an encrypted access code to the car to open the door. In this case, the encrypted access code is the same as is provided by an electronic key, as is commonly provided with current cars, with the added benefit that the identity of the user is verified before the car door can be opened.

In regard to the use of the hand-held portable wireless display and digital capture device 100 for a personal portable security system, it is important to note that the hand-held portable wireless display and digital capture device 100 can be setup to provide secure access to many different personal items or personal spaces where controlled access is desired. In the event that the portable device is lost or stolen, the security aspects incorporated within the portable device make it very difficult for another person to operate the hand-held portable wireless display and digital capture device 100 to gain access to personal items or personal spaces which have been setup for the personal portable security system. In addition, the transmitted information from the hand-held portable wireless display and digital capture device 100 to the linked device can include a set of information associated with the verification of the user which is then stored with the linked device as a record of past users of the linked device, wherein the set of information includes at least one of the following: image, thumbprint or voice. In this way, a record of the past users is stored with the device as a record of access that can be checked at a later date.

Compatibility

It is instructive to note that the present disclosure does not require that all control functions be initiated at the first site 112 or at the second site 114. Instead, control functions can be initiated from any site, including a third networked site, for example. Consequently, when the hand-held portable wireless display and digital capture device 100 is used to communicate with a more sophisticated device, inputs for capabilities that go beyond those of the hand-held portable wireless display and digital capture device 100 are possible to take advantage of different types of image capture capabilities, different digital image processing capabilities, different audio capabilities, different digital signal processors, different transmission and receiving capabilities, and different display capabilities. For example, in a portable imaging and display device 140, the display and the image capture resolution may be limited and the digital signal processor may be too limited to allow detection of hand gestures or body movements, while functions such as audio command capabilities and motion detection may be more readily available for a user interface. In contrast, a large wall mounted video communication unit such as the display and digital capture apparatus 100 shown in FIG. 6 can have a high resolution display and a high resolution image capture device with a powerful digital signal processor so that a user interface with inputs such as hand gestures, audio commands, and body movements is possible. In one embodiment of the disclosure, portable communication device 140 adapts the imaging priority protocol to enable two way video communications between the different types of devices.

Those skilled in the art will recognize that two way communication system 110 of the present disclosure can also include other forms of media during the two way communication such as still images, text, spreadsheets, audio recordings and other forms of images that could be shared during a conversation between two or more people.

The disclosure has been described in detail with particular reference to certain preferred embodiments thereof, but it will be understood that variations and modifications can be effected within the scope of the disclosure. It should be understood that the various drawing and Figs. provided within this disclosure are intended to be illustrative of the disclosure and are not intended to show proper scale.

PARTS LIST

5 Display
10a, 10b. Image capture device
14a, 14b. Display
20a, 20b. User
28. Pointer apparatus
30a, 30b. Memory
40. Image capture device
45. Microphone
46. Speaker
47. Swivel mount for image capture device
48. Hinge
80a, 80b. User
60, 62. Communication channel
94. Network
96. Distorted portion
100. Display and digital capture apparatus
110. Two-way communication system
112, 114. Site
120. Image processor
122. Controller
124. Communication control apparatus
126. Prompt detection apparatus
130 Audio components for capture and broadcast
140. Portable communication device
141. Portable communication device with directable capture
142. Controls
144. Background
146. Face
148. Window
150. Nose
164. Measurements
166. Screen cover
168. Controls

What is claimed is:

1. A method comprising:
capturing digital video images by a digital capture device having a display feature;
determining that at least some of the captured images are of poor quality caused, at least in part, by jitter or unstable motion of the digital capture device by performing at least one or both of an analysis of the digital images being captured and detecting motion of the digital capture device;
automatically adjusting one or more of the digital images that were determined to be of poor quality due to jitter or unstable motion of the digital capture device;
presenting a verification image on the display feature, wherein the verification image is configured to provide visual verification as to what the one or more adjusted digital images look like;
transmitting the adjusted digital images from the digital capture device over a wireless communication network to a second device;
receiving an instruction from the second device over the wireless communication network, said instruction representing a prompt initiated by a user at the second device to adjust a viewing angle of the digital capture device; and
responsive to the instruction from the second device, a controller of the digital capture device adjusting the viewing angle of the digital capture device towards a position corresponding to a location indicated by the user at the second device on an image displayed on a touch screen of the second device.

2. The method of claim 1, wherein automatically adjusting the one or more digital images that were determined to be of poor quality caused, at least in part, by jitter or unstable motion of the digital capture device comprises adjusting an allowed image capture area of the digital image to remove at least a portion of a background of the digital image.

3. The method of claim 2, further comprising storing the removed portion of the background of the digital image.

4. The method of claim 1, wherein the visual verification comprises presentation of face location, background, zoom, brightness, pointing, and privacy features of the transmitted adjusted digital image.

5. The method of claim 1, wherein automatically adjusting the digital images that were determined to be of poor quality caused, at least in part, by jitter or unstable motion of the digital capture device comprises detecting a face area, representing an image of a face, in the captured image and adjusting the digital images to include the detected face area.

6. The method of claim 1, wherein automatically adjusting the digital images that were determined to be of poor quality caused, at least in part, by jitter or unstable motion of the digital capture device comprises compensating for poor image capture conditions of the captured digital image.

7. The method of claim 1, wherein capturing the digital video comprises capturing a still digital image.

8. The method of claim 1, wherein presenting a verification image on the display feature at the digital capture device comprises using a split screen display to present the verification image on only a portion of the display feature.

9. An apparatus comprising:
a capture device configured to capture digital video;
a processor operatively coupled to the capture device and configured to detect motion of the apparatus that affects quality of the digital image being captured and to detect jitter by an analysis of digital video being captured and automatically adjust captured digital images in response to the detected motion and the detected jitter;
a display device configured to present a verification image, wherein the verification image is configured to provide visual verification as to what the adjusted captured digital images look like;
a transceiver operatively coupled to the processor and configured to transmit the adjusted captured digital images over a wireless communication network to a second device, and to receive from the second device over the wireless communication network an instruction to adjust a viewing angle of the capture device; and
a controller operatively coupled to the processor and the capture device and configured to adjust the viewing angle of the capture device towards a position corresponding to a location indicated by the instruction received from the second device.

10. The apparatus of claim 9, wherein the processor is further configured to adjust an allowed image capture area of the digital images such that at least a portion of a background of the digital images is removed from the digital images.

11. The apparatus of claim 9, wherein the visual verification comprises presentation of face location, background, zoom, brightness, pointing, and privacy features of the adjusted captured digital images.

12. The apparatus of claim 9, wherein automatically adjusting the digital images in response to the detected motion and the detected jitter comprises detecting a face area, representing an image of a face, in the captured images and adjusting the captured digital images to include the detected face area.

13. The apparatus of claim 9, wherein automatically adjusting the digital images in response to the detected motion and the detected jitter comprises compensating for poor image capture conditions of the captured digital images.

14. The apparatus of claim 13, wherein poor image capture conditions include one of poor capture angle, low light, motion of the camera, and motion in the scene or in bright and dark areas.

15. A system comprising:
a first digital capture device configured to capture digital video, the digital capture device including a display and one or more processors, the one or more processors configured to detect motion of the first digital capture device that affects quality of the digital video being captured and to detect jitter by an analysis of the digital video being captured and automatically adjust the digital video in response to the detected motion and the detected jitter, and to present a verification image on the display, the verification image providing visual verification as to what adjusted digital video looks like, and a transceiver operatively coupled to transmit the adjusted digital video over a wireless communication network to a second device, and to receive from the second device over the wireless communication network an instruction to adjust a viewing angle of the first digital capture device;
the second device including a touch screen display to present the adjusted digital video received from the first digital capture device over the wireless communication network and to detect a prompt provided by a user of the second device, the prompt representing the instruction to adjust the viewing angle of the first digital capture device; a prompt detection apparatus; and a control logic processor, said prompt detection apparatus and said control logic processor cooperative configured to work in conjunction with one another to provide the instruction to the first digital capture device over the wireless communication network.

16. The system of claim 15, wherein the one or more processors are further configured to adjust an allowed image capture area of the digital image such that at least a portion of a background of the digital image is removed from the digital image.

17. The system of claim 15, wherein automatically adjusting the captured digital image in response to the detected motion and the detected jitter comprises compensating for poor image capture conditions of the digital images.

* * * * *